United States Patent [19]
Boyd

[11] Patent Number: 4,519,781
[45] Date of Patent: May 28, 1985

[54] TEACHING TOOL

[76] Inventor: Jeanette D. Boyd, P.O. Box 404, Cross Rd., Kingston 5, Jamaica

[21] Appl. No.: 584,737

[22] Filed: Feb. 29, 1984

[51] Int. Cl.³ ............................................. G09B 1/06
[52] U.S. Cl. ........................... 434/156; 273/DIG. 30; 434/205; 434/211; 434/258; 434/433
[58] Field of Search ....................... 273/DIG. 30, 346; 434/258, 156, 159, 167, 205, 258, 112, 233

[56] References Cited

U.S. PATENT DOCUMENTS

| | | | |
|---|---|---|---|
| 569,846 | 10/1896 | Thompson | 434/167 |
| 2,369,804 | 2/1945 | Schoolfield | 434/167 |
| 2,570,908 | 10/1951 | Behr | 434/233 |
| 3,501,849 | 3/1970 | Olsen | 434/233 |
| 3,724,101 | 4/1973 | Slezak | 434/168 |
| 3,847,110 | 11/1974 | Inoue | 273/DIG. 30 |
| 3,953,030 | 4/1976 | Muchnick | 273/346 |
| 4,257,607 | 3/1981 | Nedwick | 273/DIG. 30 |

FOREIGN PATENT DOCUMENTS 1581453 12/1980 United Kingdom ............... 434/112

OTHER PUBLICATIONS

American Annals of the Deaf and Dumb, 1857 (Drawing, pp. 19, 61 and 62).
American Annals of the Deaf and Dumb, 1883 (pp. 132-134).
Communication with the Deaf and Blind, Apr., 1954, by Dr. Moi, (p. 11).
Popular Mechanics, Jun. 1979. (p. 90).

*Primary Examiner*—William H. Grieb
*Attorney, Agent, or Firm*—Anthony J. Casella; Gerald E. Hespos

[57] ABSTRACT

A teaching tool is provided in the form of a glove with a plurality of tags which are removably attachable to the glove. Preferably the tags are provided with indicia such as letters, numbers, words, shapes and such which can be placed on or removed from the glove as part of individual or group learning exercises for small children.

11 Claims, 6 Drawing Figures

TEACHING TOOL

BACKGROUND OF THE INVENTION

A child's education often begins long before the child commences his or her formal education in kindergarten or first grade. Structured education of same sort typically begins in the home several years prior to entering school, and often is supplemented by structured learning exercises in day care centers, nursey schools and day camps. Invariably this pre-school education aims to improve the child's motor skills and hand-eye coordination. Generally pre-school education will also be structured to increase the child's vocabulary, enable the child to identify common articles and shapes in his or her environment, teach the child numbers, letters and colors, improve the child's ability to interact socially with adults and other children, and to achive a host of other specific objectives.

In the past, most of this teaching has been carried out with traditional teaching tools such as books, pencils and paper, blackboards and certain physical exercises. More recently various electronical or electro-mechanical devices have been incorporated into learning programs.

Special gloves have been developed to improve the communication skills of deaf and mute individuals. Typically this communication tool consists of a single glove bearing all of the letters of the alphabet, and perhaps one or two basic words such as "yes" and "no". An 1857 article in the "AMERICAN ANNALS OF THE DEAF AND DUMB" shows and briefly describes such a glove. Another article published in an 1883 issue of the "AMERICAN ANNALS OF THE DEAF AND DUMB" also refers to the same glove. Another article entitled "Communication with the Deaf and Blind" was published by Moi in April 1954 indicates that deaf and blind people can communicate manually by code in which certain parts of the hand are associated with particular letters. Still another reference is shown briefly in POPULAR MECHANICS, June 1979, page 90, where a glove is imprinted or embossed with both english language letters and their Braille equivilents. This glove is intended primarily as a communication device among people who are blind, deaf and/or mute. This basic glove also is shown in British Patent Specification No. 1,581,453 which issued to Matthew in December 1980 and which is entitled "Improved Communication Device". As in the POPULAR MECHANICS reference, British Patent Specification No. 1,581,453 shows a glove having both English language letters and their Braille equivilents. As noted above, the communication device shown in British Patent Specification No. 1,581,453 is employed by wearing the glove on one hand and pointing to the letters with the other hand. Thus these references merely enable one deaf, mute and/or blind person to communicate with another person.

The known instructional and communication tools are considered to be defficient in several respects. More particularly most known instructional tools do not incorporate the improvement of motor skills, hand-eye coordination and social interaction into the more traditional forms of teaching such as the learning of letters, numbers, shapes and the like. Additionally, most known instructional techniques and tools do not combine intellectual and manipulative exercises in a manner which would reinforce both the mental and physical aspects of learning. Additionally, many instructional tools provide little or no versatility. Thus an instructional tool or device that facilitates the learning of shapes generally could not also be used to teach letters, numbers, hand-eye coordination, motor control, social interaction and such. Furthermore, many instructional tools and devices, such as many mechanical, electrical or electro-mechanical devices, are extremely costly to manufacture and therefore expensive to the consumer.

The gloves for communication among handicapped people have been extremely limited, and therefore not used outside the handicapped community. More particularly, these communication tools have offered no versatility, and have been used only to enable communication of alphabetic combinations among people who are already familiar with the symbols provided thereon.

Accordingly it is an object of the subject invention to provide an inexpensive and versatile learning tool that is particularly well suited for pre-school children.

It is another object of the subject invention to provide a learning tool to facilitate teaching of letters, numbers, shapes, objects, and such.

It is an additional object of the subject invention to provide a learning tool which will improve visual and audio perception, motor skills, hand-eye coordination and social interaction.

It is a further object of the subject invention to provide a teaching tool which can teach several mental and/or physical exercises simultaneously in a manner where the skills mutually reinforce one another.

It is still another object of the subject invention to provide a learning tool that can be worn on the hand.

It is still an additional object of the subject invention to provide a learning tool which can be used without extensive prior training, knowledge or skill.

SUMMARY OF THE INVENTION

The subject invention is directed to gloves which can be worn on the hand, and which are provided with a plurality of symbols such as numbers, letters, shapes, colors, articles, and the like. Preferably the symbols would be removably mounted on various parts of the glove such as the fingers, the palm, and the back of the hand. Specifically, in a preferred embodiment the gloves include the hook fabric fasteners, such as those sold under the trademark VELCRO. For example, the glove could be at least partly made from a fabric having an affinity to VELCRO hooks, while symbols could be on patches of fabric having hooks on one side. Alternatively, VELCRO patches could be disposed at desired locations on the glove, while the symbols are placed on a fabric which is attachable to the VELCRO hooks.

Preferably the gloves are used in pairs with the desired symbols distributed substantially evenly on both gloves so as to develop motor skills and hand-eye coordination with respect to both hands while simultaneously performing intellectual exercises as explained below.

Although the gloves could be made in any size, they typically would be manufactured in a size suitable for pre-school children. However, larger gloves can also be made for use by an instructor or parent. Additionally the gloves could be adjustable in size.

DETAILED DESCRIPTION OF THE PREFERRED EMBODIMENTS

Figure 1:
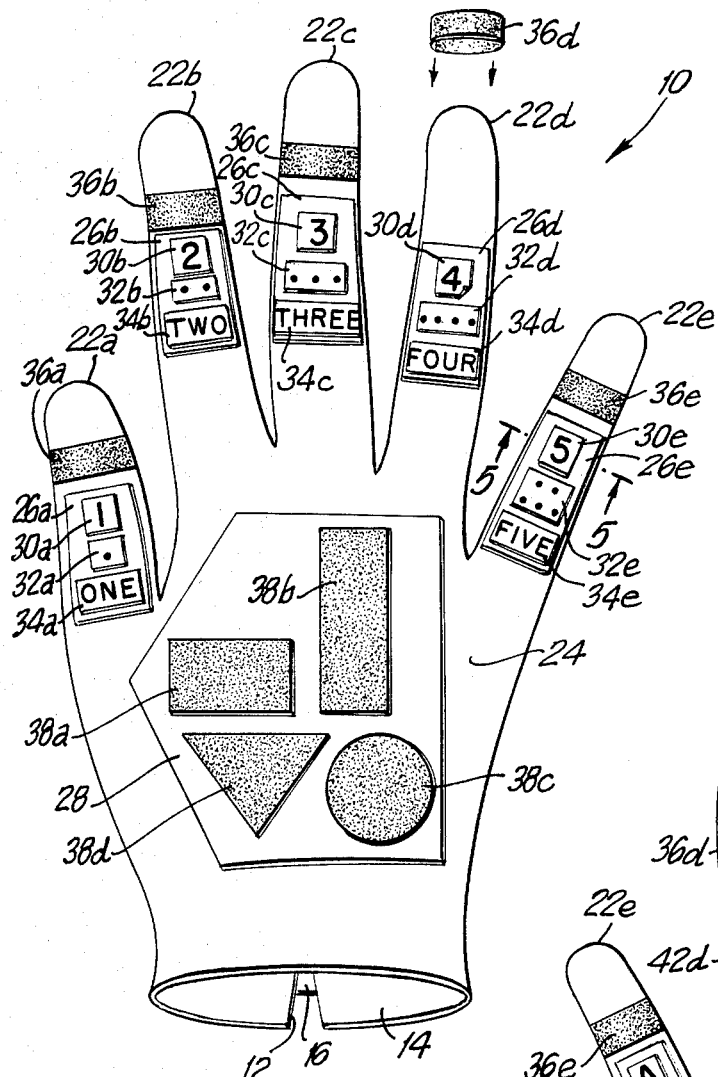
FIG. 1 is a perspective view showing the palm side of a glove of the subject invention.

The glove of the subject invention is indicated generally by the numeral 10 in FIG. 1. More particularly the glove 10 preferably is manufactured from a soft flexible material that can be comfortably worn by a child for a reasonably extended period of time under a reasonably wide range of temperature conditions. Additionally, it is preferred that glove 10 be manufactured from a durable and washable material to increase the life of the glove 10 and to ensure proper hygienic use throughout its life. For example, glove 10 could be manufactured from a variety of synthetic fabrics such as polyester, nylon, dacron and the like, certain natural fibers such as cotton or certain cotton-synthetic blends. Furthermore, as explained below, the glove could be manufactured from a continuous loop material having an affinity to a hook closure fabric such as VELCRO.

Typically the glove 10 would be manufactured to fit a small, pre-school age child. However, to ensure that the glove 10 would have reasonably wide applicability, it is provided with a longitudinal slit 12 extending away from the open end 14 of the glove 10. Additionally, an adjustment strap 16 is provided adjacent open end 14 and extends across the slit 12. The strap 16 is secured permenently to glove 10 on one side of slit 12 by stitches 18, and is releasably secured to the opposed side of slit 12 by an adjustable hook fabric fastening member 20. More particularly, the hook fabric 20 is fixedly attached to the glove 10 and the strap 16 is provided with a loop fabric having an affinity toward the hook fabric fastening member 20. The glove 10 can be adjusted to a variety of sizes by varying the location on strap 16 which is attached to the hook fabric member 20.

Figure 5:
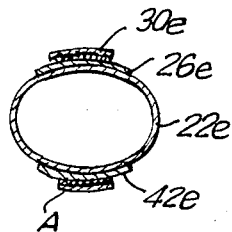
FIG. 5 is a cross-sectional view taken along line 5—5 in FIG. 1.

The glove 10 is provided with five fingers 22a through 22e and a palm portion 24. The fingers 22a through 22e and the palm 24 each are provided with one half of a hook fabric/continuous loop fabric attachment pair. More particularly, the fingers 22a through 22e and the palm 24 are provided with patches of a hook closure material 26a through 26e and 28 respectively, such as VELCRO, which are fixedly attached to the glove 10. The glove 10 then is used in conjunction with any of a variety of symbol bearing tags being formed from or attached to a continuous loop fabric having an affinity toward the hook closure fabric in patches 26a through 26e and 28. Specifically, with reference to FIGS. 1 and 5, tags 30a through 30e display the numerals 1 through 5 respectively. Tags 32a through 32e display one through five dots respectively, and tags 34a through 34e display the words one through five.

Depending on the level of the child with which the glove 10 is employed, various learning exercises can be conducted using tags. For example, for very young children the mere placement of the glove 10 on the hand and the random attachment and removcal of tags helps to develop motor skills and hand-eye coordination. Slightly older children could be asked to affix the dot tags 32a through 32e to the fingers consecutively beginning with the thumb 22a. The child then could be asked to affix the appropriate numeral tag 30a through 30e to the finger bearing the comperable dot tag 32a through 32e. Finally, on more advanced students, the appropriate word tag 34a through 34e could be applied.

FIG. 1 also shows the application of several flexible rings 36a through 36e to the fingers 22a through 22e respectively. Rings 36a through 36e are held loosely in place by friction, and are not affixed by the hook closure fabric described above. The placement of rings 36a through 36e develops motor skills and coordination not necessarily developed by the removable tags described above. Preferably each ring 36a through 36e would be a different color. Various learning exercises can be carried out utilizing these colored rings 36a through 36e. For example, the child could be requested to select a certain color (e.g. red) and apply it to a particular finger (e.g. thumb 22a). In other instances, the child could be asked to place a particular color ring on a finger which already bears a number tag. Thus a parent or instructor could ask the child to apply the blue ring to the finger bearing the numeral 3. As a further example, a child could be asked to apply similar colors (e.g. red, pink and orange) to the left hand.

The hook closure fabric 28 affixed to the palm 24 of glove 10 can also be utilized in the various learning exercises. For example, as illustrated in FIG. 1, various shape tags 38a through 38d can be affixed to the palm 28. These different shape tags 38a through 38d can be applied in accordance with the instruction of the parent or teacher. Thus, a child might be requested to place a triangle to the palm of his or her right hand. The various tags 38a through 38d also can be provided in a plurality of colors. Thus a child may be asked what the color of the triangle 38a is, or alternatively what the shape of the blue tag affixed to palm 32 is.

Figure 2:
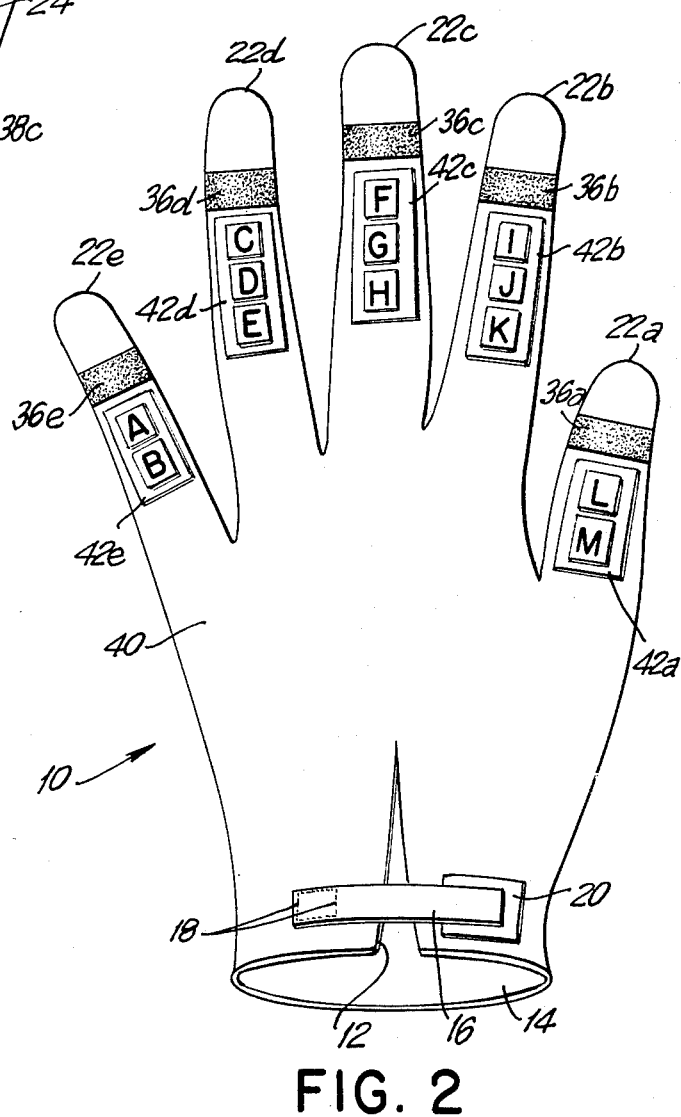
FIG. 2 is a perspective view of the back side of the glove shown in FIG. 1.

FIG. 2 shows the backside of the glove 10 depicted in FIG. 1. The backside 40 of glove 10 also is provided with hook closure fabric patches affixed to the fingers. A plurality of small tags imprinted or embroided with the letters A through M are shown as being attached to the hook closure patches 42a through 42e. In actual use, the tags bearing the letter symbols may be used in many ways. For example, the letter symbols may be disposed sequentially from one finger to the next or may be used to spell simple words. For example, a child could be asked to place on index finger 22b the combination of letter tags which spell the color of the ring 36b already affixed to index finger 22b. In less advanced exercises, the child may select letters according to their sound, and then position those letters in proximity to a number, color or shape having the same sound.

Figure 3:
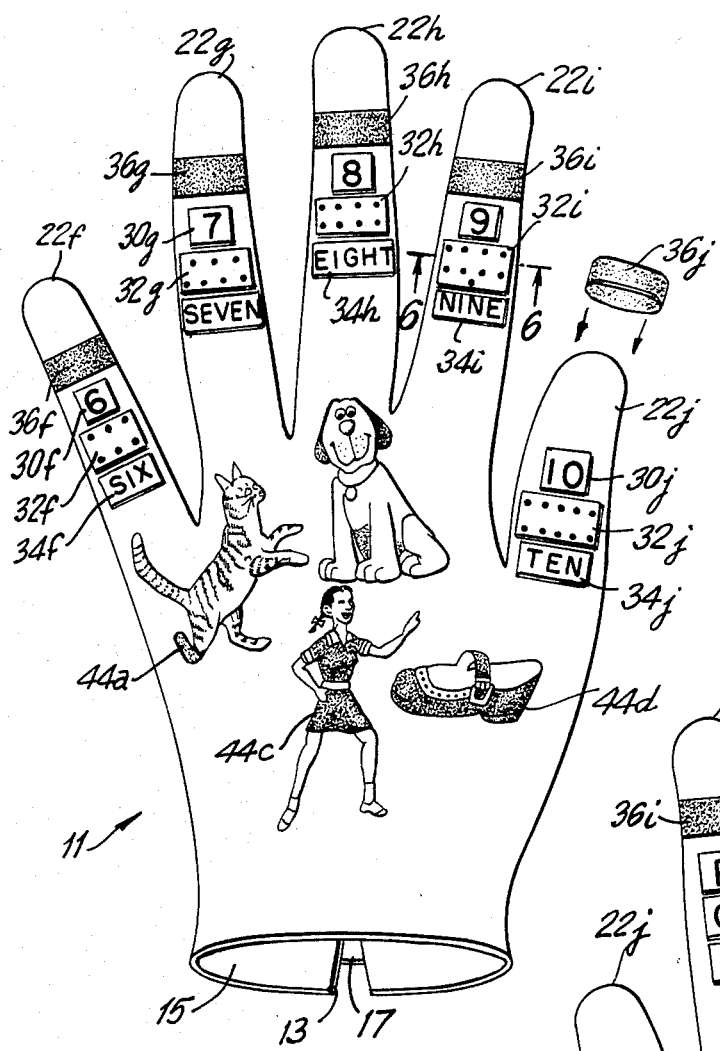
FIG. 3 is a perspective view showing the palm side of an alternate embodiment of a glove of the subject invention.
Figure 6:
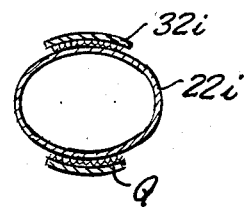
FIG. 6 is a cross-sectional view taken along line 6—6 in FIG. 3.
Figure 4:
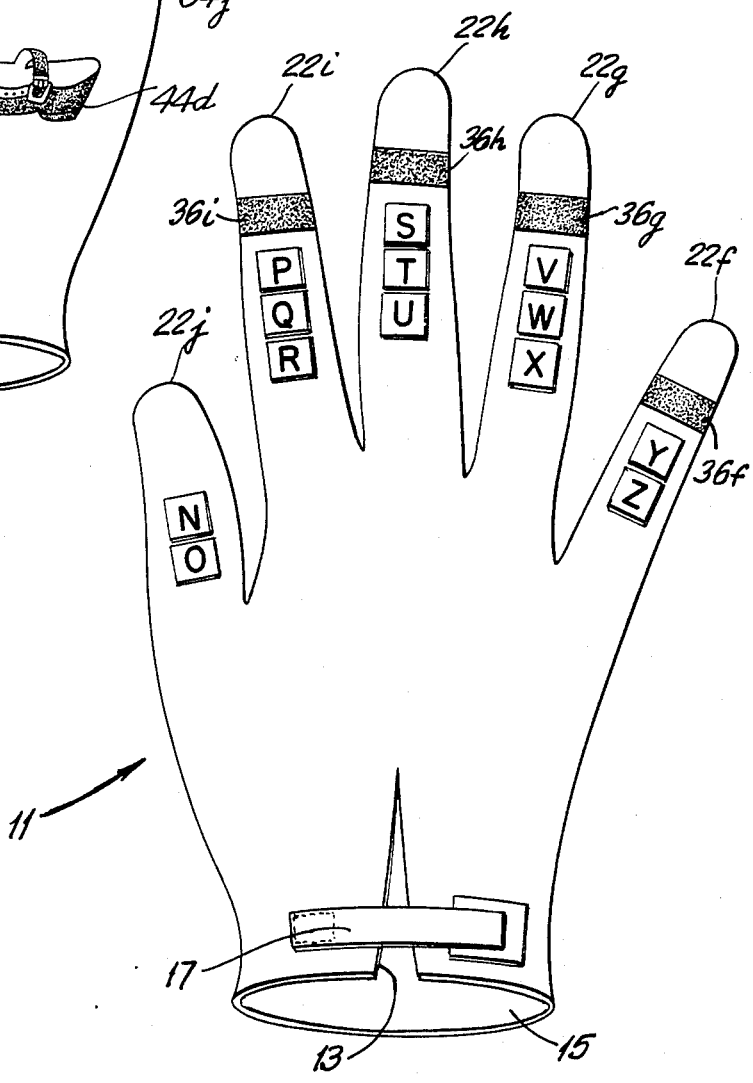
FIG. 4 is a perspective view showing the back side of the glove of FIG. 3.

FIGS. 3, 4 and 6 depict an alternate glove 11 which is similar to the glove 10 shown in FIGS. 1 and 2. Glove 11 has slit 13 adjacent open end 15 and adjustment strap 17. Although the two gloves in a pair would be made from the same material, glove 11 is shown as being manufactured from a continuous loop fabric material that has an affinity for hook closure fabrics, and that can be used in conjunction with a plurality of tags with a hook closure fabric backing. As noted above, fabrics of this type are sold under the trade name VELCRO. More particularly, the glove 11 shown in FIG. 3 has finger portions 22f through 22j and can be used with color rings 36f through 36j as described above. Additionally with reference to finger 22f, a tag 30f displaying the numeral "6" and having a hook closure fabric backing has been affixed to the loop fabric of glove 11 at finger 22f. Similarly tags 30g through 30j which display the numerals "7" through "10", also have hook closure fabric backings and can be affixed to any of the fingers 22f through 22j. These various tags illustrated in FIG. 3, could be used in substantially the same exercises as described above. However with two gloves, the number and value of the exercises increases substantially. Specifically, the concept of "left" and "right" can be taught more easily, and both motor skills and hand-eye coordination can be developed more quickly.

The glove 11 as shown in FIG. 3 further includes object tags 44a through 44d which show respectively a cat, dog, child and shoe. Of course, similar tags would be provided to depict other animals, articles (e.g. car, train, plane, television, iron, refrigerator) and people (e.g. policeman, fireman, nurse) that a child may encounter in his or her environment, or articles that may be addressed in other learning exercises (e.g. pilgrims and Indians at Thanksgiving time). The tags 44a through 44d are provided with a hook closure fabric backing as with the other tags shown in FIGS. 3 and 4.

Turning to FIG. 4, the glove 11 is shown used with a plurality of tags bearing the letters N through Z. These letter tags could be used in the same manner as the letter tags shown on the glove 10 in FIG. 2.

The gloves shown in FIGS. 1 through 6 can also be used in group learning sessions to expose the child to various forms of constructive social interaction. For example, the letter or number tags could be placed in a common area accessible to several children. The children then could take turns to sequentially select the numbers or letters of the alphabet and apply them to their gloves. In other group exercises, one child could select a tag having a shape, article or figure while other children select a number or letter tag which in some predefined way relates to the shape or article tag. For example the first child could be requested to select a shape tag, while other children would be asked to select the numeral tag with the corresponding number of sides. This same principle could be used to teach children basic addition, subtraction, regrouping and some basic spelling.

The above described exercises represent only a small number of the ways in which the subject gloves can be used. These examples are provided merely to show how the glove is used in a manner that provides interesting and fun intellectual exercises while simultaneously developing video and audio perceptions, motor skills and hand-eye coordination. The gloves further can be used in group games and learning exercises to introduce the child to structured and productive group interaction.

While the subject invention has been described and illustrated with respect to a preferred embodiment, it is understood that various changes and modifications can be made therein without departing from the spirit of the present invention which should be limited only by the scope of the appended claims.

What is claimed is:

1. A teaching tool comprising:
   - a glove adapted to be worn on the hand and formed from a flexible fabric material said glove including a plurality of glove fingers adapted to receive fingers of the hand and a glove palm adjacent and attached to each of said glove fingers; and
   - a plurality of tags releasably attached and readily reattachable to at least portions of said glove fingers and said glove palm, said plurality of tags including a first plurality of tags each of which defines a different shape, a second plurality, each of which displays a number and a third plurality each of which displays at least one letter, whereby said tags can be selectively removed from and reattached to said glove as part of a teaching exercise.

2. A teaching tool as in claim 1 wherein said tags are provided in a plurality of colors.

3. A teaching tool as in claim 1 further including a plurality of hook closure fabric patches fixedly attached to said glove fingers and said glove palm, and wherein said tags comprise a fabric that is removably attachable to said patches.

4. A teaching tool as in claim 1 wherein the glove comprises a fabric that is removably attachable to a hook closure fabric and wherein said tags comprise a hook closure fabric that is removably attachable to the fabric of the glove.

5. A teaching tool as in claim 1 wherein said glove is formed substantially entirely from said fabric that is removably attachable to a hook closure fabric, and wherein said tags include a hook closure fabric backing that is releasably attachable to said glove.

6. A teaching tool as in claim 1 wherein the glove further includes an adjustment strap.

7. A teaching tool as in claim 1 further including a plurality of rings removably disposed on the fingers of the gloves.

8. A teaching tool as in claim 7 wherein said rings are formed from a flexible fabric material.

9. A teaching tool as in claim 7 wherein said rings are respectively of different colors.

10. A teaching tool as in claim 1 comprising a pair of said gloves.

11. A teaching tool comprising a pair of gloves, each said glove in said pair having five glove finger for respectively receiving the fingers of a hand and a glove palm adjacent said glove fingers, said gloves being formed, at least in part, from a flexible material having an affinity to hook closure fabric, said teaching tool further comprising a plurality of indicia and color bearing tags having a hook closure fabric portion, said tags being removably attachable to the glove fingers and glove palms of said gloves, said plurality of tags including a first plurality each of which defines a different shape, a second plurality each of which displays a number and a third plurality each of which displays at least one letter, said teaching tool further comprising a plurality of rings removably disposed on the glove fingers, at least one said ring being of a different color than the other said rings, whereby said tags and said rings may be repeatedly removed from or attached to said gloves as part of teaching exercises.

* * * * *